United States Patent
Song

(10) Patent No.: US 10,997,497 B2
(45) Date of Patent: May 4, 2021

(54) CALCULATION DEVICE FOR AND CALCULATION METHOD OF PERFORMING CONVOLUTION

(71) Applicant: Samsung Electronics Co., Ltd., Suwon-si (KR)

(72) Inventor: Jin-ook Song, Seoul (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 349 days.

(21) Appl. No.: 15/981,440

(22) Filed: May 16, 2018

(65) Prior Publication Data
US 2019/0095782 A1    Mar. 28, 2019

(30) Foreign Application Priority Data

Sep. 28, 2017  (KR) .................. 10-2017-0126355

(51) Int. Cl.
| | |
|---|---|
| *G06N 3/063* | (2006.01) |
| *G06F 7/544* | (2006.01) |
| *G06F 17/15* | (2006.01) |
| *G06N 3/04* | (2006.01) |

(52) U.S. Cl.
CPC .......... *G06N 3/063* (2013.01); *G06F 7/5443* (2013.01); *G06F 17/15* (2013.01); *G06N 3/0454* (2013.01)

(58) Field of Classification Search
None
See application file for complete search history.

(56) References Cited

U.S. PATENT DOCUMENTS

| | | | |
|---|---|---|---|
| 5,093,801 A | | 3/1992 | White et al. |
| 5,553,196 A | * | 9/1996 | Takatori ............... G06K 9/48 706/31 |
| 6,366,936 B1 | | 4/2002 | Lee et al. |
| 7,296,045 B2 | | 11/2007 | Sehitoglu |
| 7,391,632 B2 | | 6/2008 | Kim et al. |

(Continued)

FOREIGN PATENT DOCUMENTS

| | | |
|---|---|---|
| KR | 10-0668674 | 1/2007 |
| KR | 10-0890768 | 3/2009 |

(Continued)

OTHER PUBLICATIONS

Albericio, et al.; *Cnvlutin: Ineffectual-Neuron-Free Deep Neural Network Computing*, 2016 ACM/IEEE 43rd Annual International Symposium on Computer Architecture; 1063-6897/16; (2016); pp. 1-13.

(Continued)

*Primary Examiner* — Michael D. Yaary
(74) *Attorney, Agent, or Firm* — Muir Patent Law, PLLC

(57) ABSTRACT

A device includes a first divider circuit connected to a first data lane and configured to receive a first data lane value having a first index, to receive a second index corresponding to a second data lane value from a second data lane, and to selectively output a first adding value or the first data lane value based on whether the first index is equal to the second index and a first adder circuit connected to the second data lane and the first divider circuit and configured to receive the first adding value from the first divider circuit, to receive the second data lane value, and to add the first adding value to the second data lane value to generate an addition result.

20 Claims, 14 Drawing Sheets

(56) References Cited

U.S. PATENT DOCUMENTS

| | | |
|---|---|---|
| 8,001,171 B1 | 8/2011 | Simkins et al. |
| 8,194,532 B1 | 6/2012 | Whyte |
| 8,266,196 B2 | 9/2012 | Cousineau et al. |
| 8,270,743 B2 | 9/2012 | Hsu et al. |
| 8,743,674 B2 | 6/2014 | Parnaby et al. |
| 9,495,223 B2 | 11/2016 | Ebcioglu et al. |
| 2006/0200513 A1 | 9/2006 | Cheon |
| 2017/0149589 A1 | 5/2017 | Kim |

FOREIGN PATENT DOCUMENTS

| | | |
|---|---|---|
| KR | 10-1345127 | 12/2013 |
| KR | 10-1722215 | 3/2017 |

OTHER PUBLICATIONS

Chen, et al.; *Eyeriss: A Spatial Architecture for Energy-Efficient Dataflow for Convolutional Neural Networks*; 2016 ACM/IEEE 43rd Annual International Symposium on Computer Architecture; 1063-6897/16; (2016); pp. 367-376.

\* cited by examiner

CALCULATION DEVICE FOR AND CALCULATION METHOD OF PERFORMING CONVOLUTION

CROSS-REFERENCE TO RELATED APPLICATION

This application claims the benefit of Korean Patent Application No. 10-2017-0126355, filed on Sep. 28, 2017, in the Korean Intellectual Property Office, the disclosure of which is hereby incorporated herein by reference in its entirety.

BACKGROUND

The inventive concept relates to a calculation device and a calculation method, and more particularly, to a calculation device for and a calculation method of performing a convolution calculation.

Machine learning is a field of artificial intelligence that has evolved from the study of pattern recognition and computer learning theory. Machine learning is technology for studying and constructing a system, which learns, predicts, and improves the performance thereof based on empirical data, and an algorithm for the system. Algorithms for machine learning typically build a specific model to derive predictions or decisions based on input data.

A convolutional neural network (CNN), utilized in deep learning (a type of machine learning), is an artificial neural network that has been studied in various fields, such as image processing and computer vision, to understand images and extract high-level abstracted information or generate images having new textures. CNN is a neural network in which a convolution layer and a sub-sampling layer are added to a fully connected layer of a hidden layer included in a conventional neural network and of which a structure is subdivided to improve performance. Deep learning using a CNN can provide a very high accuracy compared to other techniques. However, deep learning using a CNN may have a very low calculation speed because the CNN may have a plurality of neural network hierarchical structures and a large number of convolution calculations.

SUMMARY

Some embodiments of the inventive concept provide calculation devices configured to efficiently perform a convolution calculation. Further embodiments provide methods of efficiently performing a convolution calculation.

According to an aspect of the inventive concept, a device includes a first divider circuit connected to a first data lane and configured to receive a first data lane value having a first index, to receive a second index corresponding to a second data lane value from a second data lane, and to selectively output a first adding value or the first data lane value based on whether the first index is equal to the second index and a first adder circuit connected to the second data lane and the first divider circuit and configured to receive the first adding value from the first divider circuit, to receive the second data lane value, and to add the first adding value to the second data lane value to generate an addition result.

According to another aspect of the inventive concept, a device includes a first memory configured to store input data and a second memory configured to store weight data. A plurality of input data processor units are each configured to receive the input data and the weight data, to generate indices corresponding to data addresses of output data based on the input data and the weight data, and to output the input data and the weight data along with the index. The device further includes a calculator circuit configured to sort a value obtained by multiplying the input data and the weight data together according to an index, to generate output data, to accumulate the output data, and to generate accumulated output data according to an index.

According to another aspect of the inventive concept, methods include receiving input data and weight data, generating indices corresponding to data addresses of the input data, generating data lane values based on the input data and the weight data and summing the data lane values based on whether the indices are equal.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EMBODIMENTS

Figure 1:
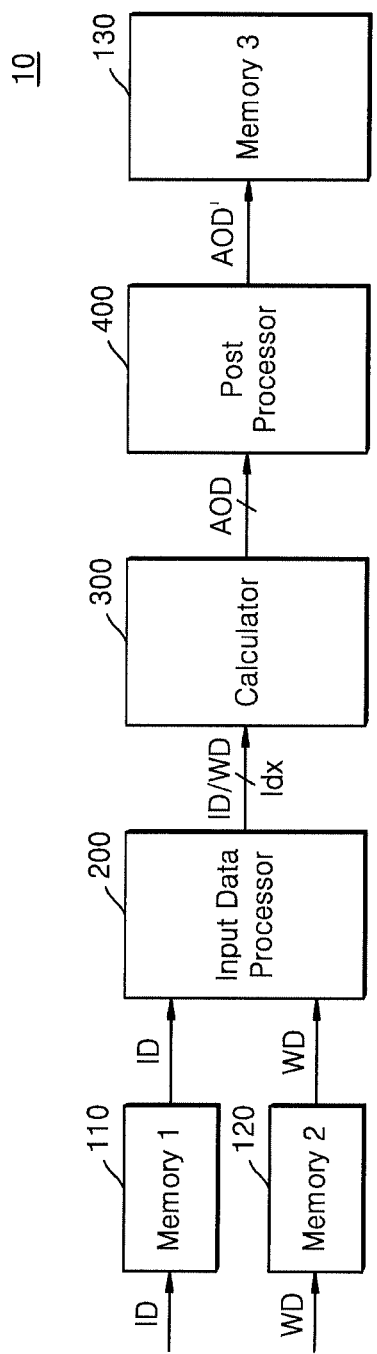
FIG. 1 is a block diagram of a calculation device according to some embodiments.

FIG. 1 is a block diagram of a calculation device 10 according to some embodiments. Referring to FIG. 1, the calculation device 10 may include a first memory 110, a second memory 120, a third memory 130, an input data processor 200, a calculator 300, and a postprocessor 400. The calculation device 10 may receive two pieces of data and perform a convolution calculation on the two pieces of data. In some embodiments, the calculation device 10 may receive input data ID (e.g., image data learned via a convolutional neural network (CNN)) and weight data WD (e.g., filter data used for the CNN), which are used for the CNN, perform a convolution calculation on the input data ID and the weight data WD, and generate accumulated output data AOD'.

The first memory 110 may store the input data ID, and the second memory 120 may store the weight data WD. The third memory 130 may store accumulated output data AOD', which is a result obtained by performing the convolution calculation on the input data ID and the weight data WD. Each of the first memory 110, the second memory 120, and the third memory 130 may be a volatile memory device, such as dynamic random access memory (DRAM) (e.g., double-data-rate synchronous DRAM (DDR SDRAM), low-power DDR (LPDDR) SDRAM, graphics DDR (GDDR) SDRAM, and Rambus DRAM (RDRAM)), static RAM (SRAM), a latch, a flip-flop, and a register, or a non-volatile memory device, such as NAND flash memory, vertical NAND (VNAND) flash memory, NOR flash memory, resistive RAM (RRAM), phase-change RAM (PRAM), magnetic RAM (MRAM), ferroelectric RAM (FRAM), and spin-transfer torque (STT) RAM. Although it is assumed herein that each of the first memory 110, the second memory 120, and the third memory 130 is SRAM, the inventive concept is not limited thereto.

Although FIG. 1 illustrates a case in which the first memory 110, the second memory 120, and the third memory 130 are separate blocks, the inventive concept is not limited thereto. In further embodiments, at least two of the first memory 110, the second memory 120, and the third memory 130 may be included in one physical memory. Also, FIG. 1 illustrates a case in which the first memory 110, the second memory 120, and the third memory 130 are included in the calculation device 10. However, the inventive concept is not limited thereto, and may also be applied to a case in which the first memory 110, the second memory 120, and the third memory 130 are included in a memory located outside the calculation device 10.

The input data processor 200 may receive the input data ID and the weight data WD and calculate an index Idx based on the input data ID and the weight data WD. In some embodiments, the input data processor 200 may calculate the index Idx based on a data address of output data corresponding to the input data ID, and the index Idx may correspond to the input data ID and the data address of the output data corresponding to the input data ID. The input data processor 200 may transmit the input data ID and the weight data WD along with the index Idx corresponding to the input data ID and the weight data WD to the calculator 300.

In some embodiments, the input data processor 200 may generate a valid value indicating whether a calculation on the input data ID and the weight data WD is required, and output the generated valid value to the calculator 300. In an example, the valid value may indicate whether at least one value of the input data ID and the weight data WD is '0', and the calculator 300 may perform a calculation only when the valid value indicates that neither of the input data ID and the weight data WD is '0', as will be described below with reference to FIG. 4.

The calculator 300 may perform a multiply-accumulation calculation on the input data ID and the weight data WD. In an example, the calculator 300 may function as a multiply-accumulation calculator (MAC). According to some embodiments of the inventive concept, the calculator 300 may multiply the input data ID and the weight data WD together and accumulate multiplied values based on the index Idx to generate accumulated output data AOD. The calculator 300 may output the generated accumulated output data AOD to the postprocessor 400. According to some embodiments of the inventive concept, the calculator 300 may have a butterfly structure as will be described below with reference to FIG. 8. The postprocessor 400 may post-process the accumulated output data AOD and store the post-processed accumulated output data in the third memory 130.

According to some embodiments of the inventive concept, since the calculator 300 performs the accumulation calculation based on the index Idx, the input data processor 200 may synchronously process input data ID corresponding to a plurality of indices Idx, thereby increasing a calculation speed. The calculator 300 may have the butterfly structure and perform the accumulation calculation based on the index Idx so that the number of adders required for the accumulation calculation may be reduced.

Figure 2A:
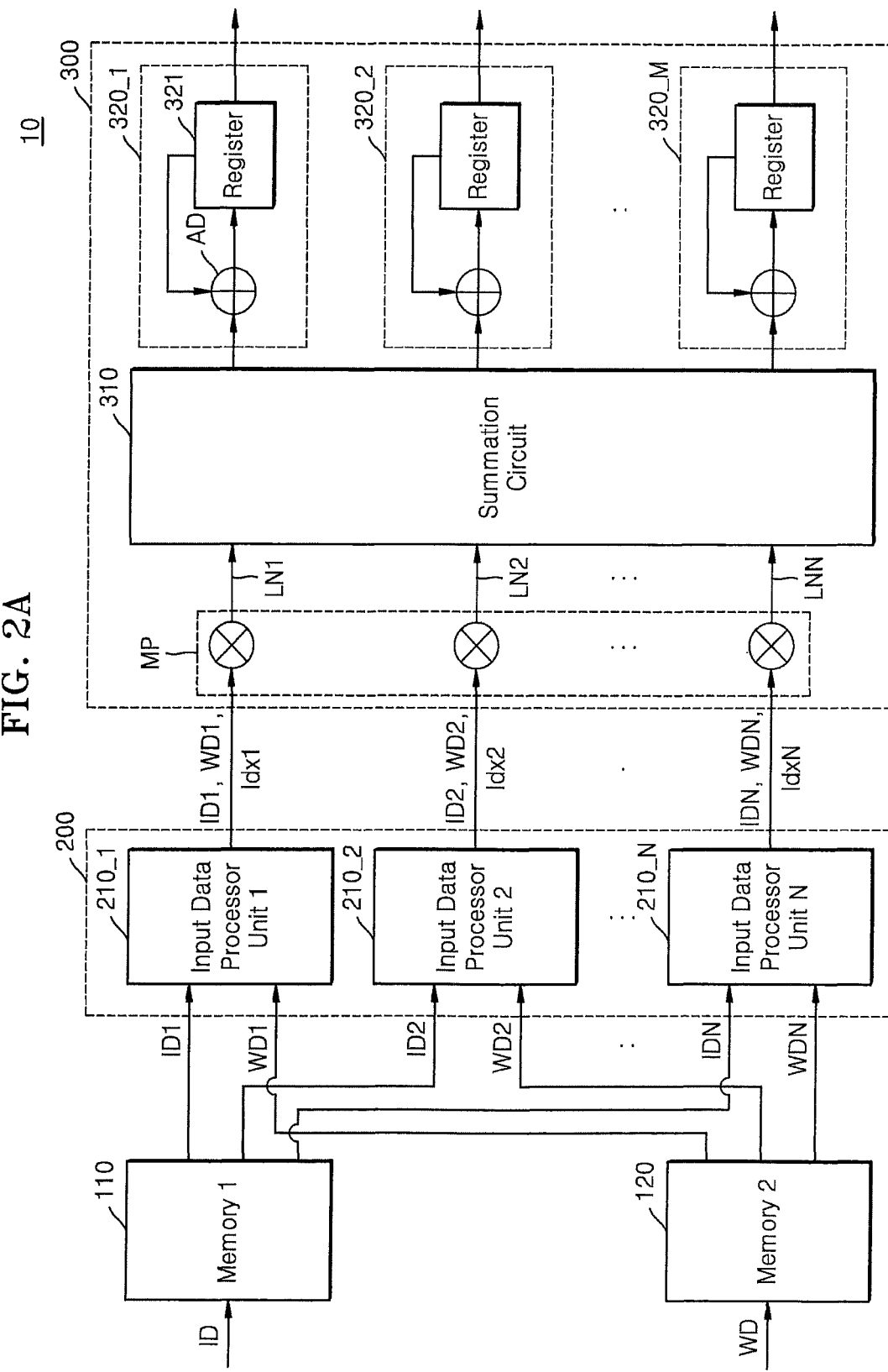
FIG. 2A is a block diagram of a calculation device according to some embodiments.

FIG. 2A is a block diagram of a calculation device 10 according to some embodiments. Specifically, FIG. 2A is a block diagram of a first memory 110, a second memory 120, an input data processor 200, and a calculator 300 of the calculation device 10. Repeated description of items from FIG. 1 will be omitted.

Referring to FIGS. 1 and 2A, the calculation device 10 may include the first memory 110, the second memory 120, the input data processor 200, and the calculator 300, and the input data processor 200 may include first to N-th input data processor units 210_1 to 210_N.

The first to N-th input data processor units 210_1 to 210_N may respectively receive first to N-th input data ID1 to IDN from the first memory 110 and respectively receive first to N-th weight data WD1 to WDN from the second memory 120. The first to N-th input data processor units 210_1 to 210_N may generate first to N-th indices Idx1 to IdxN based on data addresses of the first to N-th input data ID1 to IDN, respectively, and asynchronously output the generated first to N-th indices Idx1 to IdxN along with the first to N-th input data ID1 to IDN and the first to N-th weight data WD1 to WDN. In an example, a data address may indicate a position occupied by input data processed by each of the first to N-th input data processor units 210_1 to 210_N, in the entire data.

The calculator 300 may include a plurality of multipliers MP, a summation circuit 310, and first to M-th accumulation circuits 320_1 to 320_M. The plurality of multipliers MP may multiply the first to N-th input data ID1 to IDN by the first to N-th weight data WD1 to WDN, which are received from the first to N-th input data processor units 210_1 to 210_N, respectively, and generate lane data. The lane data may be applied to the summation circuit 310 through each of first to N-th lanes LN1 to LNN. Since the lane data is values obtained by multiplying the first to N-th input data ID1 to IDN by the first to N-th weight data WD1 to WDN, the lane data may correspond to the first to N-th indices Idx1 to IdxN. In the present specification, the lane data refers to numerical values obtained by multiplying the input data ID1 to IDN by the weight data WD1 to WDN, respectively. That is, first lane data may be a constant obtained by multiplying the first input data LD1 and the first weight data WD1 together, which are received by the first lane LN1.

The summation circuit 310 may be connected to the multiplier MP and the first to N-th lanes LN1 to LNN, which are respectively connected to the first to N-th input data processor units 210_1 to 210_N corresponding to the multiplier MP, and receive the lane data through each of the first to N-th lanes LN1 to LNN. The summation circuit 310 may sum the lane data by comparisons of the indices Idx1 to IdxN corresponding respectively thereto, and sort lane data, which is generated by sorting and summing the lane data based on the indices Idx1 to IdxN, according to a data address. The summation circuit 310 may output M output data, which is generated as sorting results, to the first to M-th accumulation circuits 320_1 to 320_M (here, M is a natural number equal to or more than 1). The summation circuit 310 will be described in detail below with reference to FIG. 7.

Each of the first to M-th accumulation circuits 320_1 to 320_M may include an adder AD and a register 321. The adder AD may receive accumulated output data from the register 321 and add the output data received from the summation circuit 310 to the accumulated output data. The adder AD may store the accumulated output data to which the received output is added, in the register 321. The register 321 may store the accumulated output data, and output accumulated output data stored in the postprocessor 400.

Figure 2B:
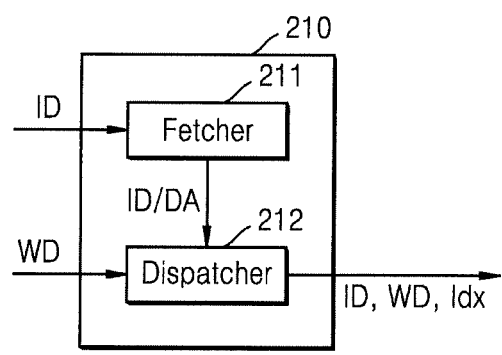
FIG. 2B is a block diagram of an input data processor according to some embodiments.

FIG. 2B is a block diagram of an input data processor unit 210 according to some embodiments. Repeat description of items from FIG. 2A will be omitted. Referring to FIGS. 2A and 2B, the input data processor unit 210 may include a fetcher 211 and a dispatcher 212. The fetcher 211 may receive input data ID from the first memory 110 and generate a data address DA based on the input data ID. The fetcher 211 may output the input data ID and the data address DA, which is generated based on the input data ID, to the dispatcher 212. The dispatcher 212 may further receive weight data WD from the second memory 120 and generate an index Idx based on the weight data WD. The index Idx may correspond to the weight data WD. The dispatcher 212 may output the input data ID and the weight data WD along with the generated index Idx to the calculator 300.

In some embodiments, the dispatcher 212 may further generate a valid value. The valid value may indicate whether a calculation on the input data ID and the weight data WD is required. In an example, the valid value may indicate whether at least one value of the input data ID and the weight data WD is '0'. In an example, the dispatcher 212 may output '0' as the valid value when at least one of the input data ID and the weight data WD has a data value of '0', and output '1' as the valid value when neither of the input data ID and the weight data WD is '0'. In another example, the dispatcher 212 may output '1' as the valid value when at least one of the input data ID and the weight data WD has a data value of '0', and output '0' as the valid value when neither of the input data ID and the weight data WD is '0'.

Figure 3:
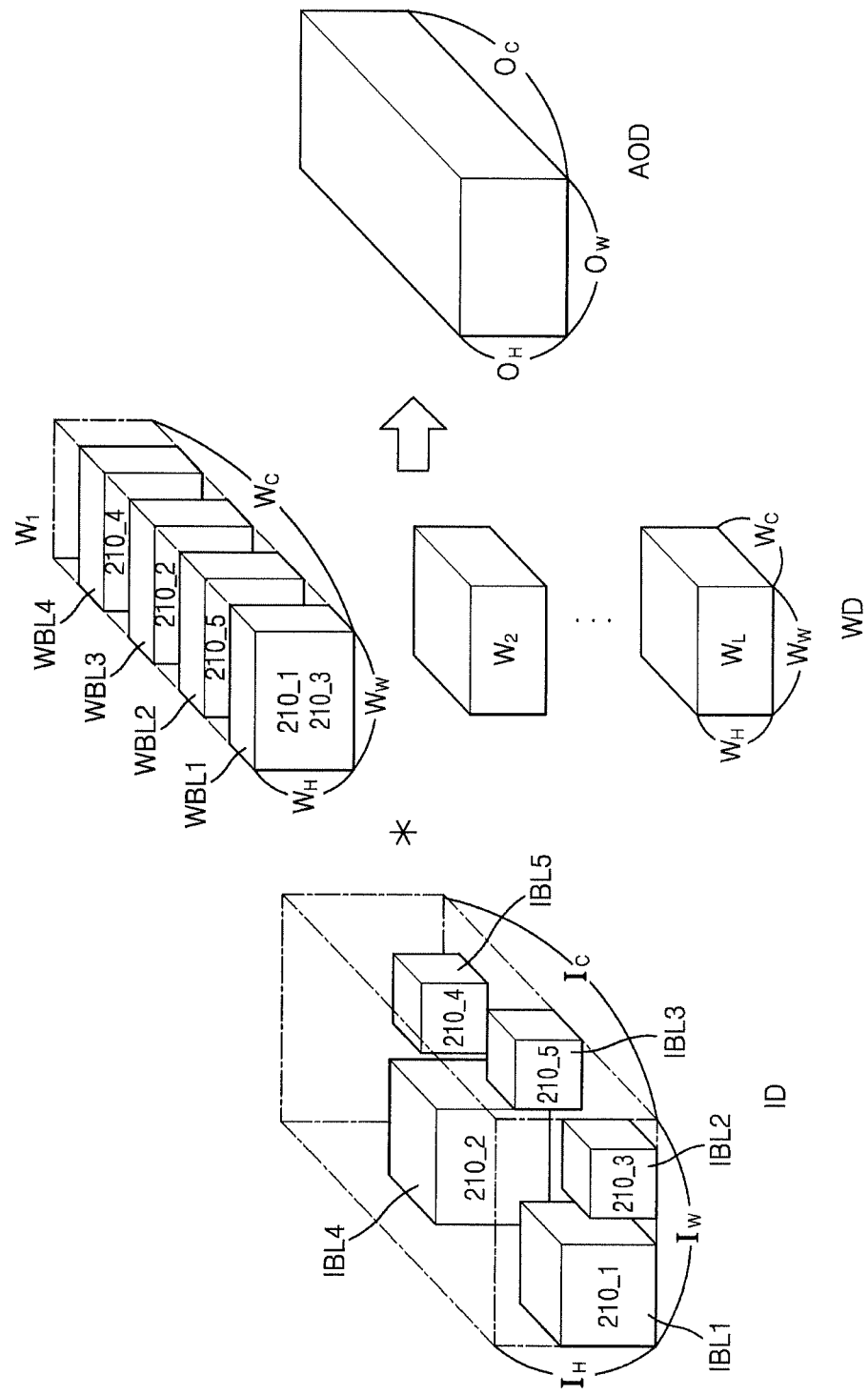
FIG. 3 is a diagram showing a convolution calculation according to some embodiments.

FIG. 3 is a diagram of a convolution calculation according to some embodiments. Referring to FIGS. 1, 2A, and 3, the calculation device 10 may receive input data ID of an $I_H \times I_W \times I_C$ matrix and weight data WD of a $W_H \times W_W \times W_C \times W_L$ matrix, perform a convolution calculation on the input data ID and the weight data WD, and generate $O_H \times O_W \times O_C$ accumulated output data AOD. First to fifth input data processor units 210_1 to 210_5 may respectively fetch data included in first to fifth input blocks IBL1 to IBL5 to perform a convolution on the first to fifth input blocks IBL1 to IBL5 included in the input data ID. The first to fifth input data processor units 210_1 to 210_5 may respectively fetch data included in first to fourth weight blocks WBL1 to WBL4, which are at the same level as first to fifth input blocks IBL1 to IBL5, and output the fetched data to the calculator 300. In an example, the first input data processor unit 210_1 may fetch data included in the first input block IBL1 and the first weight block WBL1, which is at the same level as the first input block IBL1, and output the fetched data to the calculator 300. Although not shown, weight blocks included in first to L-th weight data $W_1$ to $W_L$, which are at the same level with the first weight block WBL1, may also be fetched.

The first input data processor unit 210_1 may generate a data address of accumulated output data AOD corresponding to a value obtained by multiplying the first input block IBL1 by the first weight block WBL1, generate a first index Idx1 corresponding to the data address of the accumulated output data AOD, and output the first index Idx1 along with the first input block IBL1 and the first weight block WBL1. In contrast, the second input data processor unit 210_2 may generate a data address of accumulated output data AOD corresponding to a value obtained by multiplying the second input block IBL2 by the second weight block WBL2, generate a second index Idx2 corresponding to the data address of the accumulated output data AOD, and output the second index Idx2 along with the second input block IBL2 and the second weight block WBL2.

According to some embodiments of the inventive concept, each of the first to fifth input data processor units 210_1 to 210_5 may generate an index Idx and asynchronously process the input block and the weight block. Thus, the first to fifth input data processor units 210_1 to 210_5 may process other input blocks before other input data processor units finish processing the input blocks. Accordingly, the speed of convolution calculations may increase.

Figures 4, 5:
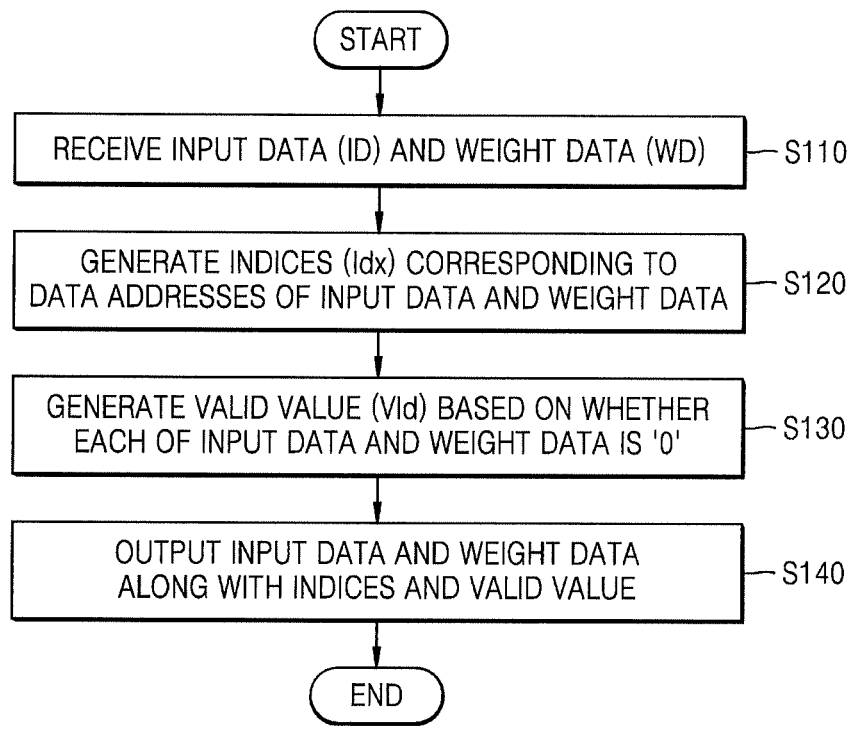
FIG. 4 is a flowchart of a method of operating an input data processor unit according to some embodiments.
FIG. 5 is a diagram of an example of an operation of an input data processing unit according to some embodiments.

FIG. 4 is a flowchart of a method of operating an input data processor unit according to some embodiments. Referring to FIGS. 2A and 4, each of the first to N-th input data processor units 210_1 to 210_N may receive input data ID and weight data WD from the first memory 110 and the second memory 120, respectively (S110). Each of the first to N-th input data processor units 210_1 to 210_N may generate an index Idx corresponding to data addresses of the received input data ID and the weight data WD (S120). Each of the first to N-th input data processor units 210_1 to 210_N may generate a valid value Vld depending on whether each of the input data ID and the weight data WD is '0' (S130). Each of the first to N-th input data processor units 210_1 to 210_N may output the input data ID and the weight data WD along with the index Idx and the valid value Vld to the calculator 300 (S140).

FIG. 5 is a diagram of an example of an operation of an input data processor unit according to some embodiments. Referring to FIGS. 4 and 5, in a first case Case1, each of the first to N-th input data processor units 210_1 to 210_N may receive first input data ID1, which is not '0', and first weight data WD1, which is not '0'. Each of the first to N-th input data processor units 210_1 to 210_N may determine a data address of output data corresponding to the first input data ID1 and the first weight data WD1 to be a first data address DA1. Each of the first to N-th input data processor units 210_1 to 210_N may generate '1' as a valid value Vld because neither of the first input data ID1 and the first weight data WD1 is '0'. In an example, each of the first to N-th input data processor units 210_1 to 210_N may perform an AND calculation to generate the valid value Vld.

Each of the first to N-th input data processor units 210_1 to 210_N may generate a first index Idx1 as the index Idx corresponding to the first data address DA1. In an example, the first to N-th input data processor units 210_1 to 210_N may substitute the first data address DA1 into a predetermined numerical formula and generate the first index Idx1. In another example, the first to N-th input data processor units 210_1 to 210_N may match a predetermined table with the first data address DA1 to generate the first index Idx1. Each of the first to N-th input data processor units 210_1 to 210_N may output the first input data ID1 and the first weight data WD1 along with the generated valid value Vld, which is '1', and the first index Idx1 to the calculator 300.

In a second case Case2, each of the first to N-th input data processor units 210_1 to 210_N may receive second input data ID2, which is not '0', as input data ID and receive '0' as weight data WD. Also, each of the first to N-th input data processor units 210_1 to 210_N may determine a data address of output data corresponding to the second input data ID2 to be a second data address DA2. Each of the first to N-th input data processor units 210_1 to 210_N may generate '0' as a valid value Vld because the weight data WD is '0'. Furthermore, each of the first to N-th input data processor units 210_1 to 210_N may generate a second index Idx2 as an index Idx corresponding to the second data address DA2. Each of the first to N-th input data processor units 210_1 to 210_N may output the second input data ID2 and the weight data WD, which is '0', along with the generated valid value Vld, which is '0', and the second index Idx2.

In a third case Case3, each of the first to N-th input data processor units 210_1 to 210_N may receive '0' as input data ID and second weight data WD2, which is not '0', as weight data WD. Also, each of the first to N-th input data processor units 210_1 to 210_N may determine a data address of output data to be a third data address DA3, and generate '0' as a valid value Vld because the input data ID is '0'. Furthermore, each of the first to N-th input data processor units 210_1 to 210_N may generate a third index Idx3 as an index Idx corresponding to the third data address DA3. Each of the first to N-th input data processor units 210_1 to 210_N may output the input data ID, which is '0', and the second weight data WD2 along with the generated valid value Vld, which is '0', and the third index Idx3 to the calculator 300.

In a fourth case Case4, each of the first to N-th input data processor units 210_1 to 210_N may receive '0' as input data ID and receive '0' as weight data WD. Also, each of the first to N-th input data processor units 210_1 to 210_N may determine a data address of output data to be a fourth data address DA4, and generate '0' as a valid value Vld since each of the input data ID and the weight data WD is '0'. Furthermore, each of the first to N-th input data processor units 210_1 to 210_N may generate a fourth index Idx4 as an index Idx corresponding to the fourth data address DA4. Each of the first to N-th input data processor units 210_1 to 210_N may output the input data ID, which is '0', and the weight data WD, which is '0', along with the generated valid value Vld, which is '0', and the fourth index Idx4 to the calculator 300.

Figure 6:
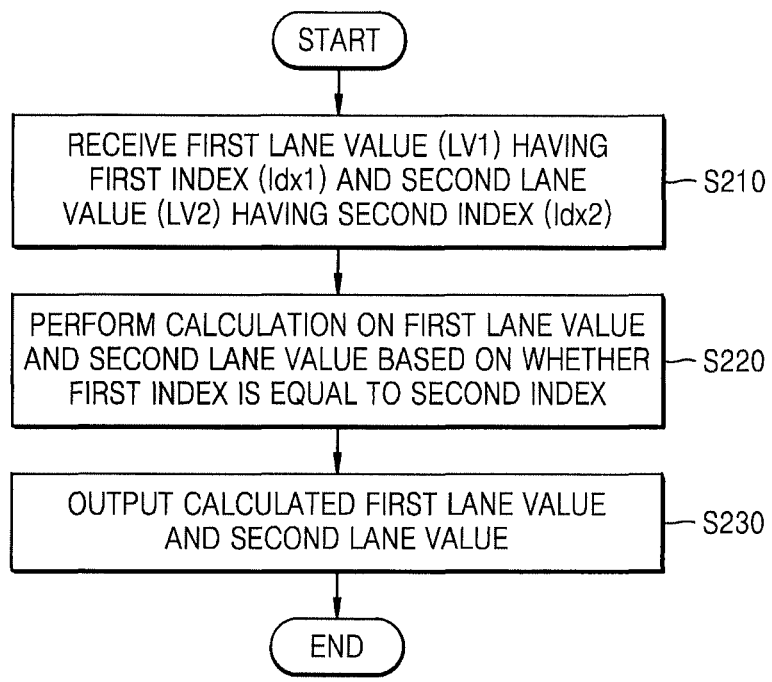
FIG. 6 is a flowchart of operations of a summation circuit according to some embodiments.

FIG. 6 is a flowchart of a method of operating a summation circuit 310 according to some embodiments. Referring to FIGS. 2A and 6, the summation circuit 310 may receive a first lane value LV1 having a first index Idx1 and a second lane value LV2 having a second index Idx2 (S210). The summation circuit 310 may perform a calculation on the first lane value LV1 and the second lane value LV2 based on whether the first index Idx1 is equal to the second index Idx2 (S220). In the present specification, a lane value may refer to data flowing through each lane. That is, a data value of the first lane value LV1 may be changed later by adding another lane data to the first lane value LV1 due to a comparison of indices.

In an example, when the first index Idx1 is equal to the second index Idx2, the summation circuit 310 may add the data value of the first lane value LV1 to the second lane value LV2 and set the first lane value LV1 as '0'. In another example, when the first index Idx1 is equal to the second index Idx2, the summation circuit 310 may add a data value of the second lane value LV2 to the first lane value LV1 and set the second lane value LV2 as '0'. When the first index Idx1 is different from the second index Idx2, the summation circuit 310 may not perform a calculation on the first lane value LV1 and the second lane value LV2 but maintain the first lane value LV1 and the second lane value LV2.

Figure 7:
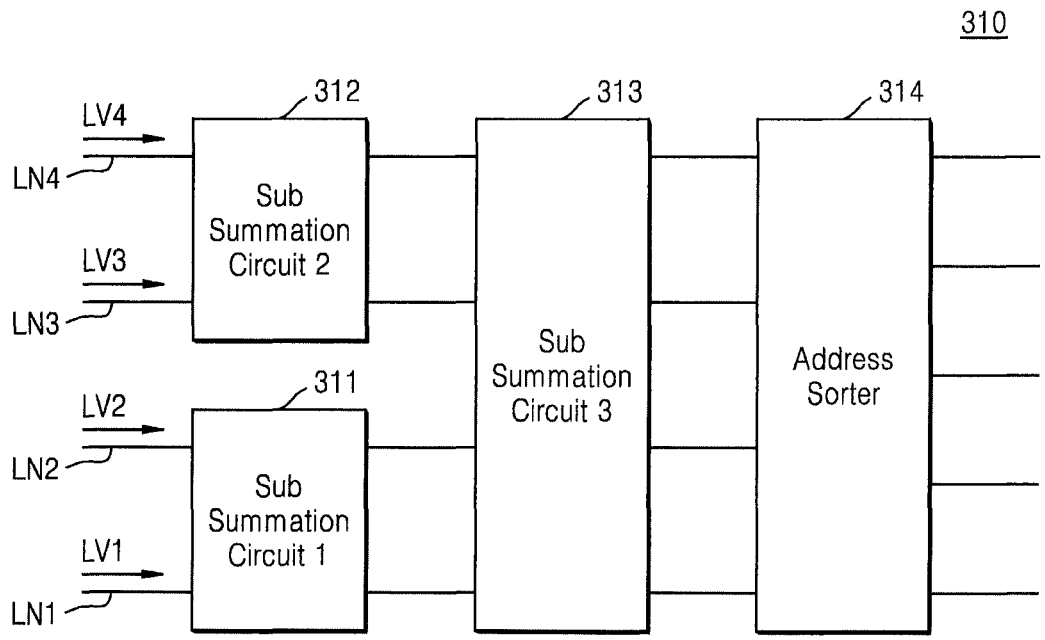
FIG. 7 is a block diagram of a summation circuit according to some embodiments.

FIG. 7 is a block diagram of a summation circuit according to some embodiments. Specifically, FIG. 7 is a block diagram of a summation circuit 310 having a 2-stage butterfly structure. Referring to FIGS. 2A and 7, the summation circuit 310 may be connected to first to fourth lanes LN1 to LN4 and include a first sub-summation circuit 311, a second sub-summation circuit 312, a third sub-summation circuit 313, and an address sorter 314. The first sub-summation circuit 311 may be connected to the first lane LN1 and the second lane LN2 and perform a calculation on a first lane value LV1 received from the first lane LN1 and a second lane value LV2 received from the second lane LN2. The second sub-summation circuit 312 may be connected to the third lane LN3 and the fourth lane LN4 and perform a calculation on a third lane value LV3 received from the third lane LN3 and a fourth lane value LV4 received from the fourth lane LN4. The third sub-summation circuit 313 may be connected to the first to fourth lanes LN1 to LN4 and perform a calculation on the first lane value LV1, the second lane value LV2, the third lane value LV3, and the fourth lane value LV4.

The summation circuit 310 may include a circuit having a butterfly structure. In the present specification, a "butterfly structure" may refer to a structure having a plurality of stages configured to perform a calculation on lanes of sub-groups. That is, in a first stage, the first sub-summation circuit 311 may perform a calculation on the first lane value LV1 and the second lane value LV2, and the second sub-summation circuit 312 may perform a calculation on the third lane value LV3 and the fourth lane value LV4. Since the first sub-summation circuit 311 and the second sub-summation circuit 312 perform calculations based on indices as described above, the calculation may be performed when the first lane value LV1 and the second lane value LV2 have the same index, while the calculation may not be performed when the first lane value LV1 and the second lane value LV2 have different indices. Similarly, the calculation may be performed when the third lane value LV3 and the fourth lane value LV4 have the same index, while the calculation may not be performed when the third lane value LV3 is different from the fourth lane value LV4.

That is, in the first stage, the first sub-summation circuit 311 may no longer need to perform a calculation between the first lane value LV1 and the second lane value LV2, and the second sub-summation circuit 312 may no longer need to perform a calculation between the third lane value LV3 and the fourth lane value LV4. Accordingly, a third sub-summation circuit 313 included in a second stage may no longer perform the above-described calculations but perform, based on indices, a calculation between the first lane value LV1 and the third lane value LV3, a calculation between the first lane value LV1 and the fourth lane value LV4, a calculation between the second lane value LV2 and the third lane value LV3, and a calculation between the second lane value LV2 and the fourth lane value LV4.

Due to the above-described operations, values that are summed based on respective indices may be calculated as the first to fourth lane values LV1 to LV4. Thus, since the calculation of the first to fourth lane values LV1 to LV4 is completed according to an index, indices of the first to fourth lane values LV1 to LV4 may not mutually overlap. Herein, indices that do not mutually overlap may be referred to as being mutually unique. According to some embodiments, the summation circuit 310 may select the butterfly structure so as to reduce the number of necessary adders, as will be described below with reference to FIG. 8.

The address sorter 314 may receive the first to fourth lane values LV1 to LV4, sort the first to fourth lane values LV1 to LV4, which are received based on indices, according to a data address, and output data as sorted results to the accumulation circuit 320. The address sorter 314 may generate output data, which is in number equal to or different from the number of the received first to fourth lane values LV1 to LV4. In some embodiments, the address sorter 314 may perform a sorting operation according to a data address by substituting indices into the inverse of a predetermined numeral formula used by the dispatcher 212. In further embodiments, the address sorter 314 may perform a sorting operation according to a data address by retrieving data addresses corresponding to indices from a predetermined table used by the dispatcher 212.

Figure 8:
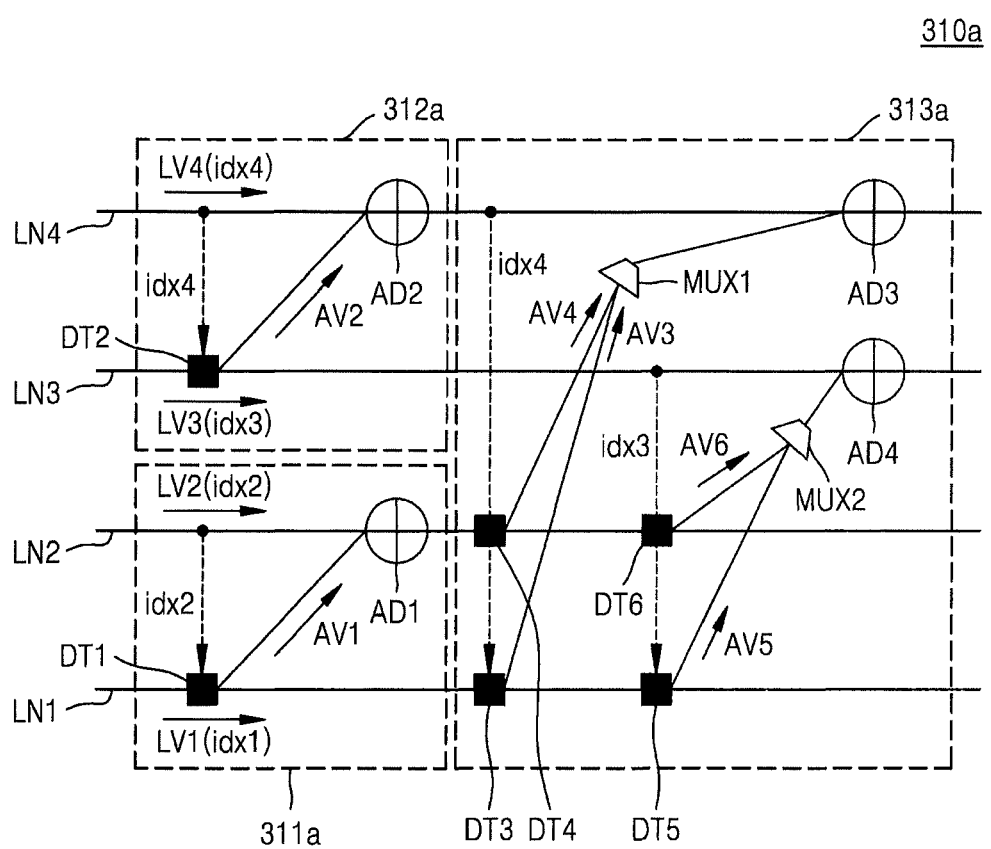
FIG. 8 is a circuit diagram of a summation circuit according to some embodiments.

FIG. 8 is a circuit diagram of a summation circuit according to some embodiments. Specifically, FIG. 8 is a circuit diagram of a summation circuit 310a having a 2-stage structure. The same descriptions as with reference to FIG. 7 will be omitted. Referring to FIG. 8, the summation circuit 310a may include a first sub-summation circuit 311a, a second sub-summation circuit 312a, and a third sub-summation circuit 313a. The first sub-summation circuit 311a may include a first divider DT1 and a first adder AD1, and the second sub-summation circuit 312a may include a second divider DT2 and a second adder AD2. The third sub-summation circuit 313a may include third to sixth dividers DT3 to DT6, first and second multiplexers MUX1 and MUX2, and third and fourth adders AD3 and AD4. In some embodiments, each of the first to sixth dividers DT1 to DT6 may be embodied by a demultiplexer or an inverter multiplexer.

The first sub-summation circuit 311a may include the first divider DT1 connected to a first lane LN1 and the first adder AD1 connected to a second lane LN2. The first sub-summation circuit 311a may receive a first lane value LV1 having a first index idx1 and a second lane value LV2 having a second index idx2. The first divider DT1 may receive the second index idx2 from the second lane LN2 and compare the first index idx1 with the second index idx2. When the first index idx1 is equal to the second index idx2, the first divider DT1 may set a first adding value AV1 as a data value of the first lane value LV1 and set the first lane value LV1 as '0'. When the first index idx1 is not equal to the second index idx2, the first divider DT1 may set the first adding value AV1 as '0' and maintain the data value of the first lane value LV1. The first adder AD1 may add the first adding value AV1 to a second lane value LV2.

The second sub-summation circuit 312a may include the second divider DT2 connected to a third lane LN3 and the second adder AD2 connected to a fourth lane LN4. The second sub-summation circuit 312a may receive a third lane value LV3 having a third index idx3 and a fourth lane value LV4 having a fourth index idx4. The second divider DT2 may receive the fourth index idx4 from the second lane LN4 and compare the third index idx3 with the fourth index idx4. When the third index idx3 is equal to the fourth index idx4, the second divider DT2 may set a second adding value AV2 as a data value of the third lane value LV3 and set the third lane value LV3 as '0'. When the third index idx3 is not equal to the fourth index idx4, the second divider DT2 may set the second adding value AV2 as '0' and maintain the data value of the third lane value LV3. The second adder AD2 may add the second adding value AV2 to the fourth lane value LV4.

The third divider DT3 may be connected to the first lane LN1 and the first multiplexer MUX1 and receive the fourth index idx4 from the fourth lane LN4. The third divider DT3 may compare the first index idx1 with the fourth index idx4. When the first index idx1 is equal to the fourth index idx4, the third divider DT3 may set a third adding value AV3 as the data value of the first lane value LV1 and set the first lane value LV1 as '0'. When the first index idx1 is not equal to the fourth index idx4, the third divider DT3 may set the third adding value AV3 as '0' and maintain the data value of the first lane value LV1.

The fourth divider DT4 may be connected to the second lane LN2 and the first multiplexer MUX1 and receive the fourth index idx4 from the fourth lane LN4. The fourth divider DT4 may compare the second index idx2 with the fourth index idx4. When the second index idx2 is equal to the fourth index idx4, the fourth divider DT4 may set a fourth adding value AV4 as a data value of the second lane value LV2 and set the second lane value LV2 as '0'. When the second index idx2 is not equal to the fourth index idx4, the fourth divider DT4 may set the fourth adding value AV4 as '0' and maintain the data value of the second lane value LV2.

The first multiplexer MUX1 may output any one of the third adding value AV3 and the fourth adding value AV4 to the third adder AD3. Since the summation of the first lane value LV1 and the second lane value LV2 is completed by the first sub-summation circuit 311a based on indices, the first lane value LV1 and the second lane value LV2 may have different indices. Since only an adding value connected to a lane having an index equal to the fourth index idx4 has a value other than '0', at least one of the third adding value AV3 and the fourth adding value AV4 may be '0'. The first multiplexer MUX1 may output one of the third adding value AV3 and the fourth adding value AV4, which is not '0', to the third adder AD3, and output '0' to the third adder AD3 when both the third adding value AV3 and the fourth adding value AV4 are '0'. The third adder AD3 may add a value received from the first multiplexer MUX1 to the fourth lane value LV4.

The fifth divider DT5 may be connected to the first lane LN1 and the second multiplexer MUX2 and receive the third index idx3 from the third lane LN3. The fifth divider DT5 may compare the first index idx1 with the third index idx3. When the first index idx1 is equal to the third index idx3, the fifth divider DT5 may set a fifth adding value AV5 as the data value of the first lane value LV1 and set the first lane value LV1 as '0'. When the first index idx1 is not equal to the third index idx3, the fifth divider DT5 may set the fifth adding value AV5 as '0' and maintain the data value of the first lane value LV1.

The sixth divider DT6 may be connected to the second lane LN2 and the second multiplexer MUX2 and receive the third index idx3 from the third lane LN3. The sixth divider DT6 may compare the second index idx2 with the third index idx3. When the second index idx2 is equal to the third index idx3, the sixth divider DT6 may set a sixth adding value AV6 as the data value of the second lane value LV2 and set the second lane value LV2 as '0'. When the second index idx2 is not equal to the third index idx3, the sixth divider DT6 may set the sixth adding value AV6 as '0' and maintain the data value of the second lane value LV2.

The second multiplexer MUX2 may output any one of the fifth adding value AV5 and the sixth adding value AV6 to the fourth adder AD4. As described above, since the summation of the first lane value LV1 and the second lane value LV2 is completed by the first sub-summation circuit 311a based on indices, the first lane value LV1 and the second lane value LV2 may have different indices. Thus, at least one of the fifth adding value AV5 and the sixth adding value AV6 may be '0'. The second multiplexer MUX2 may output one of the fifth adding value AV5 and the sixth adding value AV6, which is not '0', to the fourth adder AD4, and output '0' to the fourth adder AD4 when both the fifth adding value AV5 and the sixth adding value AV6 are '0. The fourth adder AD3 may add a value received from the second multiplexer MUX2 to the third lane value LV3.

In some embodiments, the summation circuit 310a may further receive a valid value indicating whether a data value of each of the first to fourth lane values LV1 to LV4 is '0', through each of the first to fourth lanes LN1 to LN4. In addition to determining whether indices are equal, each of the first to sixth dividers DT1 to DT6 may further receive the valid value. When the valid value is '0', each of the first to sixth dividers DT1 to DT6 may output '0' as an adding value and maintain a lane value. In an example, the first divider DT1 may further receive a first valid value indicating whether a data value of the first lane value LV1 is '0' from a first input data processor unit connected to the first lane LN1, further receive a second valid value indicating whether a data value of the second lane value LV2 is '0' from a second input data processor unit connected to the second lane LN2, and set the first adding value AV1 as the data value of the first lane value LV1 only when both the first valid value and the second valid value are not '0' and the first index idx1 is equal to the second index idex2.

As described above, the summation circuit 310a may have the butterfly structure shown in FIG. 8 and perform summations by comparing indices according to a stage. Thus, summations for a convolution calculation may be performed with a small number of adders.

Figure 9:
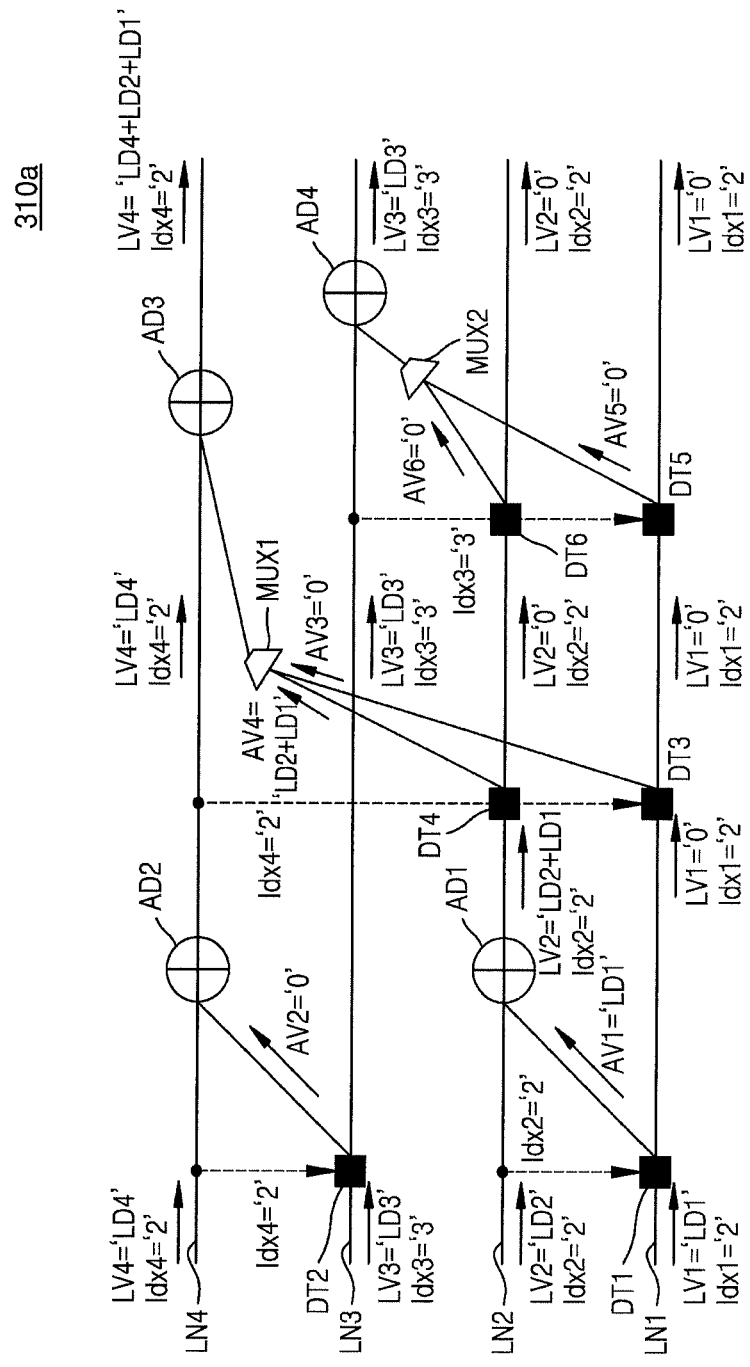
FIG. 9 is a circuit diagram of an example of an operation of a summation circuit according to some embodiments.

FIG. 9 is a circuit diagram of an example of an operation of a summation circuit 310a according to some embodiments. Repeat descriptions to items from FIG. 8 will be omitted. Referring to FIGS. 8 and 9, the summation circuit 310a may receive first lane data LD1 as a first lane value LV1 through the first lane LN1, receive '2' as a first index Idx1 corresponding to the first lane data LD1, receive second lane data LD2 as a second lane value LV2 through the second lane LN2, and receive '2' as a second index Idx2 corresponding to the second lane data LD2. The summation circuit 310a may receive third lane data LD3 as a third lane value LV3 through the third lane LN3, receive '3' as a third index Idx3 corresponding to the third lane data LD3, receive fourth lane data LD4 as a fourth lane value LV4 through the fourth lane LN4, and receive '2' as a fourth index Idx4 corresponding to the fourth lane data LD4.

The first divider DT1 may receive '2' as the second index Idx2 and compare the second index Idx2 with the first index Idx1. Since the first index Idx1 is '2' and equal to the second index Idx2, the first divider DT1 may set a first adding value AV1 as the first lane data LD1 and the first lane value LV1 as '0'. The first adder AD1 may add the first lane data LD1 to the second lane value LV2 so that the second lane value LV2 may become 'LD2+LD1'.

The second divider DT2 may receive '2' as the fourth index Idx4 and compare the fourth index Idx4 with the third index Idx3. Since the third index Idx3 is different from the fourth index Idx4, the second divider DT2 may set a second adding value AV2 as '0' and maintain the third lane value LV3 as the third lane data LD3. The second adder AD2 may add '0' to the fourth lane value LV4 so that the fourth lane value LV4 may maintain 'LD4'.

The fourth divider DT4 may receive '2' as the fourth index Idx4 and compare the fourth index Idx4 with the second index Idx2. Since the second index Idx2 is '2' and equal to the fourth index Idx4, the fourth divider DT4 may set a fourth adding value AV4 as 'LD2+LD1', which is the data value of the second lane value LV2 and set the second lane value LV2 as '0'. The third divider DT3 may output '0' as a third adding value AV3. The first multiplexer MUX1 may output a data value of the fourth adding value AV4, which is not '0', to the third adder AD3. The third adder AD3 may add 'LD2+LD1' to the fourth lane value LV4 so that the fourth lane value LV4 may become 'LD4+LD2+LD1'.

Since each of the first lane value LV1 and the second lane value LV2 is '0', the fifth divider DT5 and the sixth divider DT6 may output '0' as the fifth adding value AV5 and the sixth adding value AV6, respectively, and the second multiplexer MUX2 may output '0' to the fourth adder AD4. Accordingly, the fourth adder AD4 may add '0' to the third lane value LV3 so that the third lane value LV3 may maintain 'LD3'.

As described above, the summation circuit 310a according to some embodiments of the inventive concept may sum lane data according to an index by using a relatively small number of adders.

Figure 10:
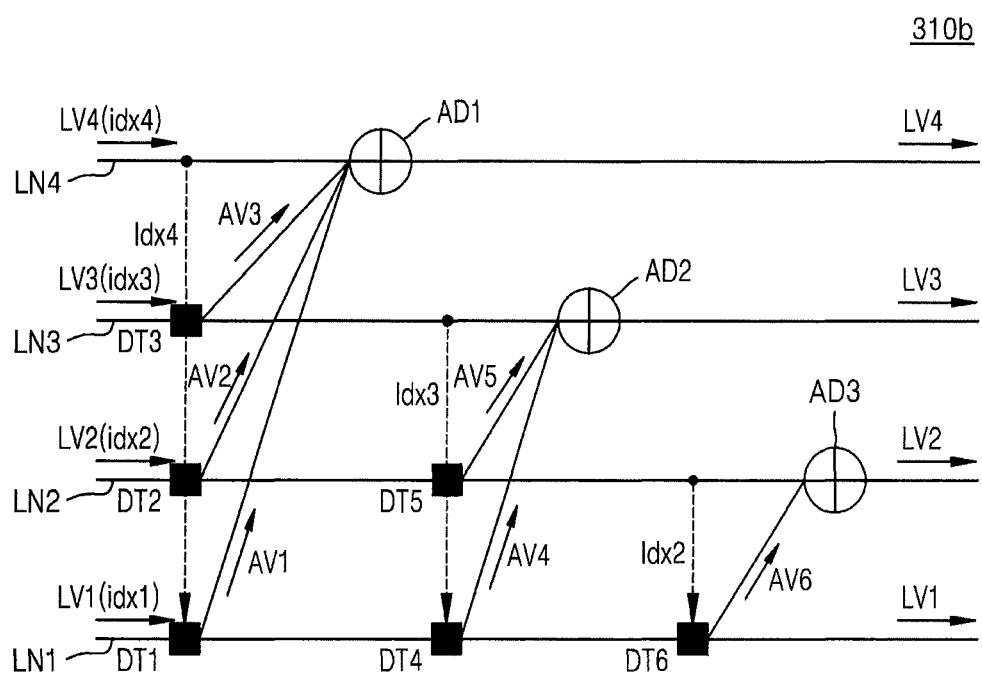
FIG. 10 is a circuit diagram of a summation circuit according to some embodiments.

FIG. 10 is a circuit diagram of a summation circuit 310b according to some embodiments. Referring to FIG. 10, the summation circuit 310b may include first to sixth dividers DT1 to DT6 and first to third adders AD1 to AD3 and be connected to first to fourth lanes LN1 to LN4. The summation circuit 310b may receive first to fourth lane values LV1 to LV4 having first to fourth indices idx1 to idx4 through the first to fourth lanes LN1 to LN4, respectively.

The first divider DT1 connected to the first lane LN1 may receive the fourth index idx4 and compare the first index idx1 with the fourth index idx4. When the first index idx1 is equal to the fourth index idx4, the first divider DT1 may set a first adding value AV1 as a data value of the first lane value LV1 and set the first lane value LV1 as '0'. When the first index idx1 is not equal to the fourth index idx4, the first divider DT1 may set the first adding value AV1 as '0' and maintain the data value of the first lane value LV1.

The second divider DT2 connected to the second lane LN2 may receive the fourth index idx4 and compare the second index idx2 with the fourth index idx4. When the second index idx2 is equal to the fourth index idx4, the second divider DT2 may set a second adding value AV2 as a data value of the second lane value LV2 and set the second lane value LV2 as '0'. When the second index idx2 is not equal to the fourth index idx4, the second divider DT2 may set the second adding value AV2 as '0' and maintain the data value of the second lane value LV2.

The third divider DT3 connected to the third lane LN3 may receive the fourth index idx4 and compare the third index idx3 with the fourth index idx4. When the third index idx3 is equal to the fourth index idx4, the third divider DT3 may set a third adding value AV3 as a data value of the third lane value LV3 and set the third lane value LV3 as '0'. When the third index idx3 is not equal to the fourth index idx4, the third divider DT3 may set the third adding value AV3 as '0' and maintain the data value of the third lane value LV3. The first adder AD1 may add the received first to third adding values AD1 to AD3 to the fourth lane value LV4.

The fourth divider DT4 connected to the first lane LN1 may receive the third index idx3 and compare the first index idx1 with the third index idx3. When the first index idx1 is equal to the third index idx3, the fourth divider DT4 may set a fourth adding value AV4 as the data value of the first lane value LV1 and set the first lane value LV1 as '0'. When the first index idx1 is not equal to the third index idx3, the fourth divider DT4 may set the fourth adding value AV4 as '0' and maintain the data value of the first lane value LV1.

The fifth divider DT5 connected to the second lane LN2 may receive the third index idx3 and compare the second index idx2 with the third index idx3. When the second index idx2 is equal to the third index idx3, the fifth divider DT5 may set a fifth adding value AV5 as the data value of the second lane value LV2 and set the second lane value LV2 as '0'. When the second index idx2 is not equal to the third index idx3, the fifth divider DT5 may set the fifth adding value AV5 as '0' and maintain the data value of the second lane value LV2. The second adder AD2 may add the received fourth and fifth adding values AD4 and AD5 to the third lane value LV3.

The sixth divider DT6 connected to the first lane LN2 may receive the second index idx2 and compare the first index idx1 with the second index idx2. When the first index idx1 is equal to the second index idx2, the sixth divider DT6 may set a sixth adding value AV6 as the data value of the first lane value LV1 and set the first lane value LV1 as '0'. When the first index idx1 is not equal to the second index idx2, the sixth divider DT6 may set the sixth adding value AV6 as '0' and maintain the data value of the first lane value LV1. The third adder AD3 may add the received sixth adding value AD6 to the second lane value LV2.

As described above, the summation circuit 310 according to some embodiments of the inventive concept may output the first to fourth lane values LV1 to LV4 as results obtained by adding lane data according to an index, to the address sorter (refer to 314 in FIG. 7).

Figure 11:
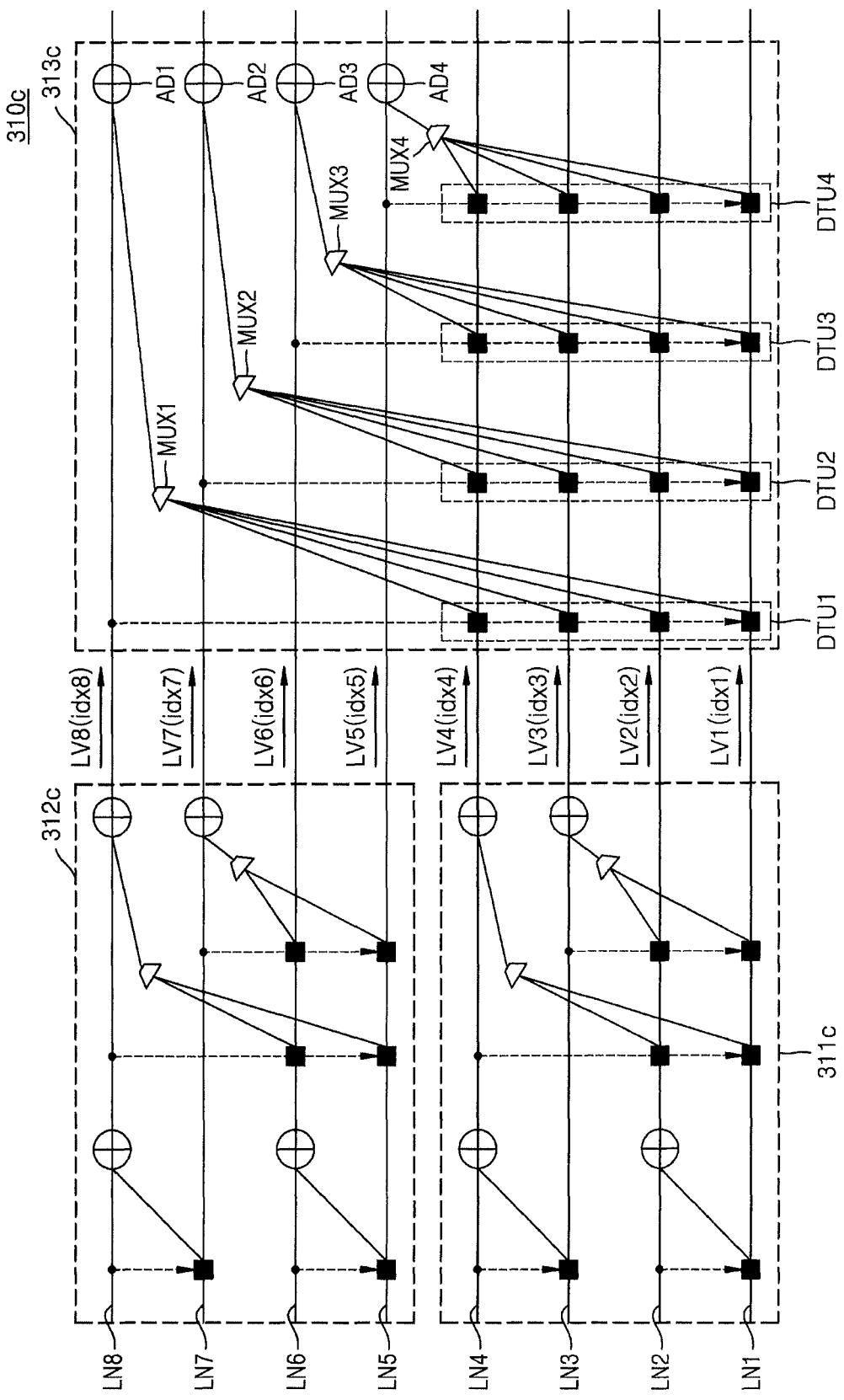
FIG. 11 is a circuit diagram of a summation circuit according to some embodiments.

FIG. 11 is a circuit diagram of a summation circuit according to some embodiments. Specifically, FIG. 11 is a circuit diagram of a summation circuit 310c having a 3-stage structure. Repeat descriptions of items from FIG. 8 will be omitted. Referring to FIG. 11, the summation circuit 310c may include a first sub-summation circuit 311c, a second sub-summation circuit 312c, and a third sub-summation circuit 313c. Since the first sub-summation circuit 311c and the second sub-summation circuit 312c are the same as or similar to the summation circuit 310a of FIG. 8, descriptions thereof will be omitted.

The third sub-summation circuit 313c may receive first to fourth lane values LV1 to LV4 from the first sub-summation circuit 311c and receive fifth to eighth lane values LV5 to LV8 from the second sub-summation circuit 312c. As described above, the first to fourth lane values LV1 to LV4 may be summed according to an index and in a mutually unique state due to the first sub-summation circuit 311c, and the fifth to eighth lane values LV5 to LV8 may be in a mutually unique state due to the second sub-summation circuit 312c. Accordingly, the third sub-summation circuit 313c may not need to perform a summation among the first to fourth lane values LV1 to LV4 or a summation among the fifth to eighth lane values LV5 to LV8. However, the third sub-summation circuit 313c may perform a summation between the eighth lane value LV8 and the first to fourth lane values LV1 to LV4, a summation between the seventh lane value LV7 and the first to fourth lane values LV1 to LV4, a summation between the sixth lane value LV6 and the first to fourth lane values LV1 to LV4, and a summation between the fifth lane value LV5 and the first to fourth lane values LV1 to LV4.

The third sub-summation circuit 313c may include first to fourth divider units DTU1 to DTU4, first to fourth multiplexers MUX1 to MUX4, and first to fourth adders AD1 to AD4. The first divider unit DTU1 may receive an eighth index idx8 and include a plurality of dividers connected to first to fourth lanes LN1 to LN4, respectively. The first divider unit DTU1 may compare the eighth index idx8 with each of the first to fourth indices idx1 to idx4 and output a data value of a lane value to the first multiplexer MUX1 when the compared indices are equal. As described above, since the first to fourth lane values LV1 to LV4 are mutually unique, at least two of the first to fourth indices idx1 to idx4 may not be equal to the eighth index idx8. Accordingly, when one of the first to fourth indices idx1 to idx4 is equal to the eighth index idx8, the first divider unit DTU1 may output a data value of any one lane value, which is not '0', to the first multiplexer MUX1. When neither of the first to fourth indices idx1 to idex4 is equal to the eighth index idx8, the first divider unit DTU1 may output '0' to the first multiplexer MUX1. The first multiplexer MUX1 may output the received value to the first adder AD1, and the first adder AD1 may add the value received from the first multiplexer MUX1 to the eighth lane value LV8.

The second divider unit DTU2 may receive a seventh index idx7 and include a plurality of dividers connected to the first to fourth lanes LN1 to LN4, respectively. The second divider unit DTU2 compare the seventh index idx7 with each of the first to fourth indices idx1 to idx4 and output a data value of a lane value to the second multiplexer MUX2 when the compared indices are equal. When any one of the first to fourth indices idx1 to idx4 is equal to the seventh index idx7, the second divider unit DTU2 may output a data value of any one lane value, which is not 0', to the second multiplexer MUX2. When neither of the first to fourth indices idx1 to idx4 is equal to the seventh index idx7, the second divider unit DTU2 may output '0' to the second multiplexer MUX2. The second multiplexer MUX2 may output the received value to the second adder AD2, and the second adder AD2 may add the value received from the second multiplexer MUX2 to the seventh lane value LV7.

The third divider unit DTU3 may receive a sixth index idx6 and include a plurality of dividers connected to the first to fourth lanes LN1 to LN4, respectively. The third divider unit DTU3 may compare the sixth index idx6 with each of the first to fourth indices idx1 to idx4 and output a data value of a lane value to the third multiplexer MUX3 when the compared indices are equal. When any one of the first to fourth indices idx1 to idx4 is equal to the sixth index idx6, the third divider unit DTU3 may output a data value of any one lane value, which is not '0', to the third multiplexer MUX3. When neither of the first to fourth indices idx1 to idx4 is equal to the sixth index idx6, the third divider unit DTU3 may output '0' to the third multiplexer MUX3. The third multiplexer MUX3 may output the received value to the third adder AD3, and the third adder AD3 may add the value received from the third multiplexer MUX3 to the sixth lane value LV6.

The fourth divider unit DTU4 may receive a fifth index idx5 and include a plurality of dividers connected to the first to fourth lanes LN1 to LN4, respectively. The fourth divider unit DTU4 may compare the fifth index idx5 with each of the first to fourth indices idx1 to idx4 and output a data value of a lane value to the fourth multiplexer MUX4 when the compared indices are equal. When any one of the first to fourth indices idx1 to idx4 is equal to the fifth index idx5, the fourth divider unit DTU4 may output a data value of any one lane value, which is not '0', to the fourth multiplexer MUX4. When neither of the first to fourth indices idx1 to idx4 is equal to the fifth index idx5, the fourth divider unit DTU4 may output '0' to the fourth multiplexer MUX4. The fourth multiplexer MUX4 may output the received value to the fourth adder AD4, and the fourth adder AD4 may add the value received from the fourth multiplexer MUX4 to the fifth lane value LV5.

Although a calculators having a 2-stage butterfly structure and a 3-stage butterfly structure are illustrated herein, the inventive concept is not limited thereto and may be applied to a calculator having a butterfly structure with four or more stages. According to some embodiments, a calculator having an N-stage butterfly structure may include $N/2 \times \log_2 N$ adders, $N/2 \times (2^{(\log_2 N)} - 1)$ dividers, and $N/2 \times (\log_2 N - 1)$ multiplexers (here, N is a natural number equal to or more than 1).

Figure 12A:
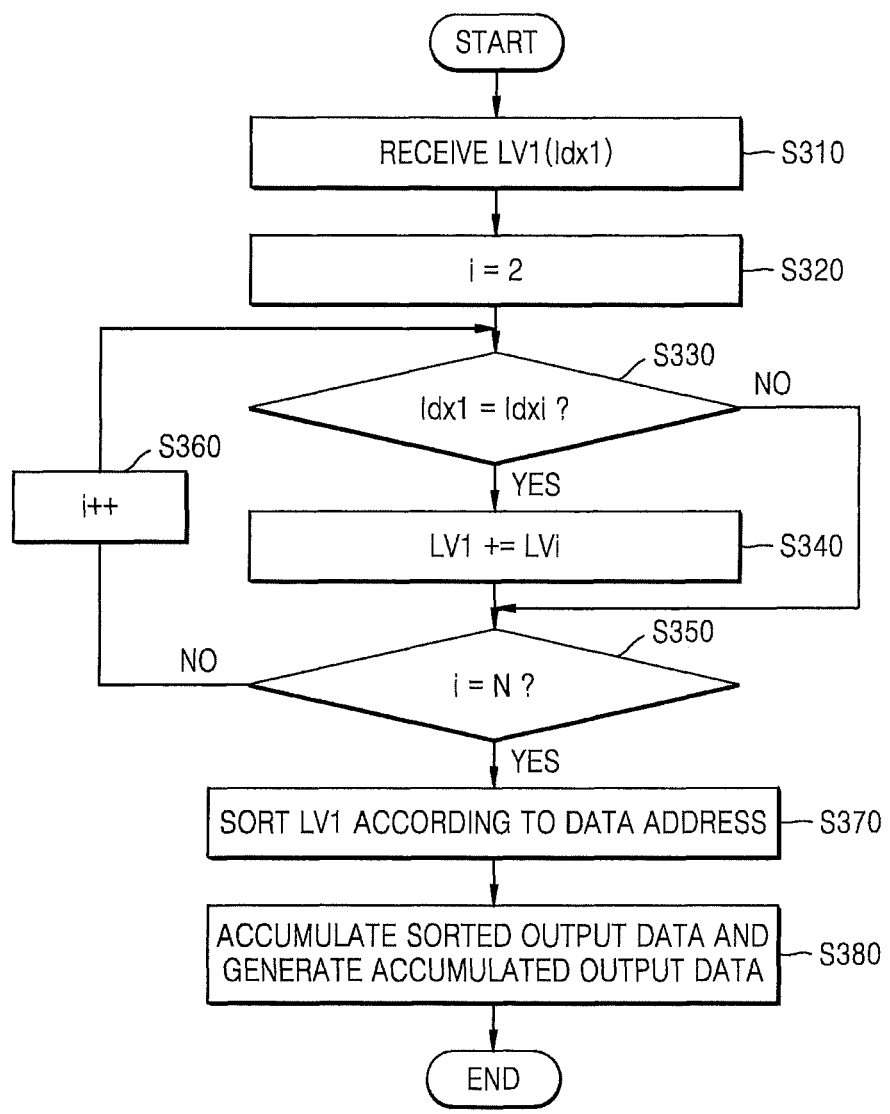
FIG. 12A is a flowchart of an algorithm for a calculator according to some embodiments.

FIG. 12A is a flowchart of an algorithm for a calculator 300 according to some embodiments. Specifically, FIG. 12A is a flowchart of an algorithm by which the calculator 300 generates accumulated output data corresponding to a first lane value LV1. Referring to FIGS. 1 and 12A, the calculator 300 may receive a first lane value LV1 having a first index Idx1 (S310). The calculator 300 may substitute '2' as an initial value into an integer "i" (S320) and determine whether the first index Idx1 is equal to an i-th index Idxi (S330). When the first index Idx1 is equal to the i-th index Idxi, the calculator 300 may increase the first lane value LV1 by as much as a data value of an i-th lane value LVi (S340). When the first index Idx1 is not equal to the i-th index Idxi, the calculator 300 may not add the data value of the i-th lane value LVi to the first lane value LV1.

The calculator 300 may determine whether the integer (i) is a predetermined constant N (S350). If the integer (i) is not the predetermined constant N, 1 may be added to the integer (i) (S360), and operations S330 to S350 may be repeated. If the integer (i) is the predetermined constant N, the calculator 300 may sort the first lane value LV1 according to a data address (S370). The calculator 300 may accumulate sorted output data and generate the accumulated output data (S380).

Figure 12B:
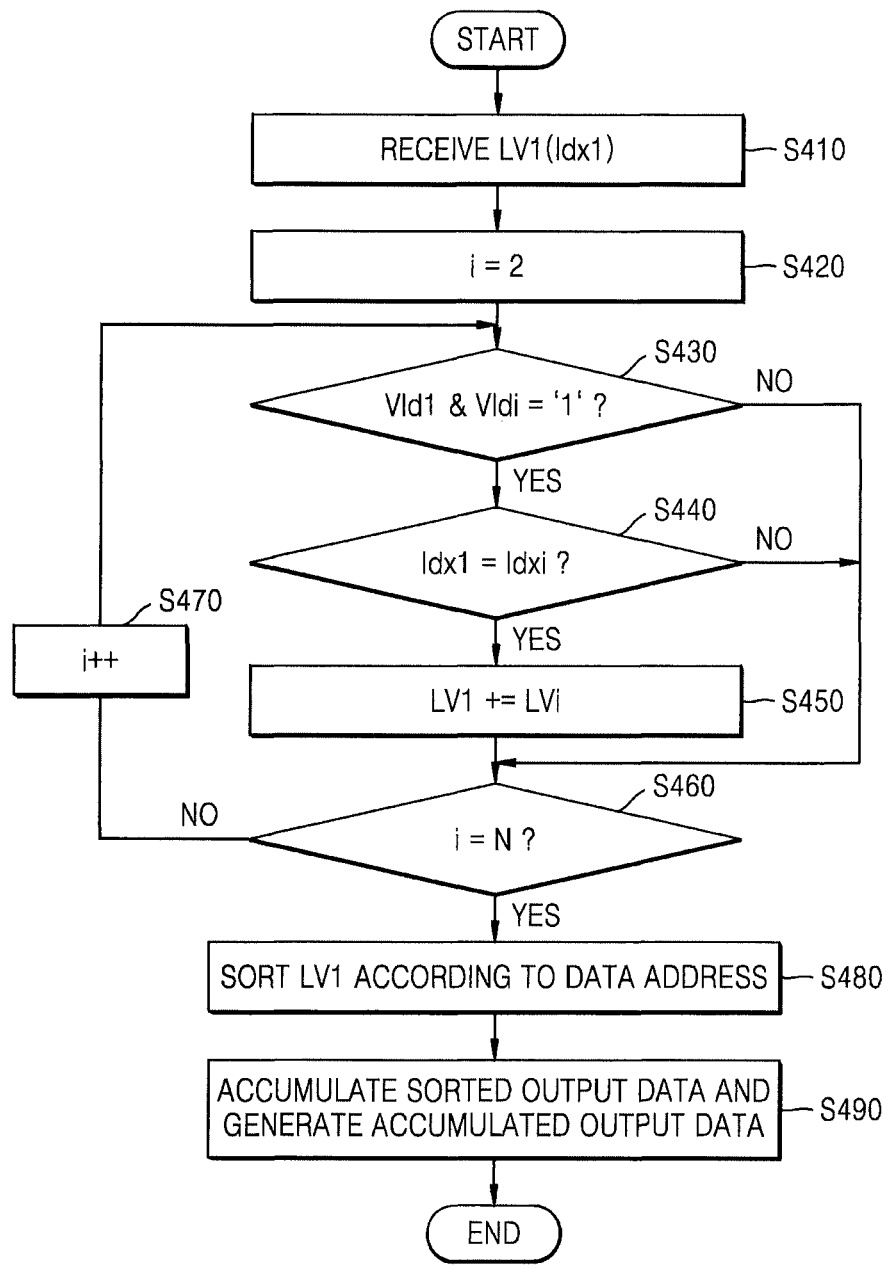
FIG. 12B is a flowchart of an algorithm for a calculator according to some embodiments.

FIG. 12B is a flowchart of an algorithm for a calculator 300 according to some embodiments. Specifically, FIG. 12B is a flowchart of an algorithm by which a calculator 300 generates accumulated output data corresponding to a first lane value LV1. Referring to FIGS. 1 and 12B, the calculator 300 may receive a first lane value LV1 having a first index Idx1 (S410). The calculator 300 may substitute '2' as an initial value the integer (i) (S420) and determine whether each of the first valid value Vld1 and the i-th valid value Vldi is '0' (S430). The first valid value Vld1 may indicate whether the first lane value LV1 is '0', and the i-th valid value Vldi may indicate whether an i-th lane value LVi is '0'.

When both the first valid value Vld1 and the i-th valid value Vldi are '1', it may be determined whether the first index Idx1 is equal to the i-th index Idxi (S440). If the first index Idx1 is equal to the i-th index Idxi, the calculator 300 may increase the first lane value LV1 by as much as a data value of the i-th lane value LVi (S450). If the first index Idx1 is not equal to the i-th index Idxi, the calculator 300 may not add the data value of the i-th lane value LVi to the first lane value LV1. Even if at least one of the first valid value Vld1 and the i-th valid value Vldi is not '1', the calculator 300 may not add the data value of the i-th lane value LVi to the first lane value LV1.

The calculator 300 may determine whether the integer (i) is a predetermined constant N (S460). If the integer (i) is not the predetermined constant N, 1 may be added to the integer (i) (S470), and operations S430 to S460 may be repeated. If the integer (i) is the predetermined constant N, the calculator 300 may sort the first lane value LV1 according to a data address (S480). The calculator 300 may accumulate sorted output data and generate accumulated output data (S490).

Figure 13:
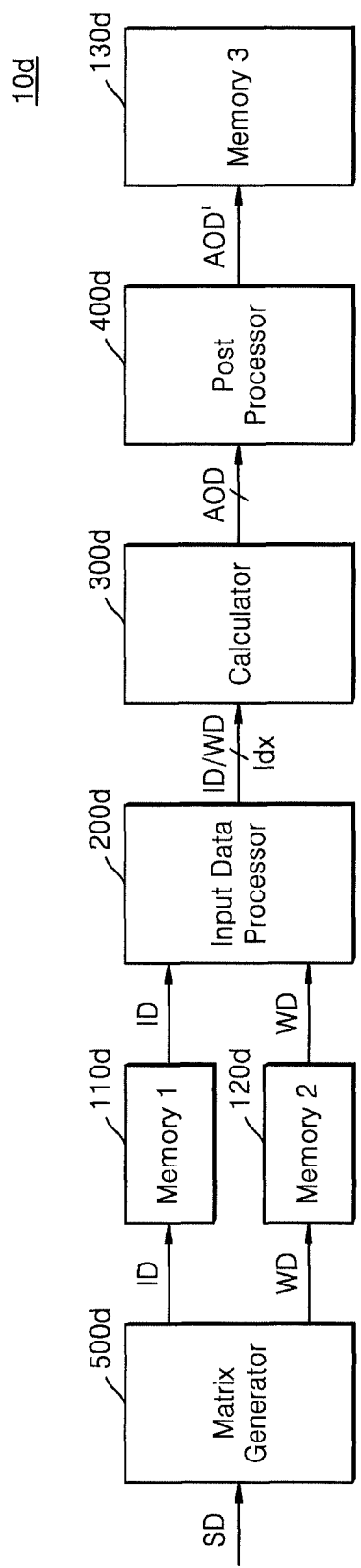
FIG. 13 is a block diagram of a calculation device according to some embodiments.

FIG. 13 is a block diagram of a calculation device 10d according to some embodiments. Repeat same descriptions of items from FIG. 1 will be omitted. Referring to FIG. 13, the calculation device 10d may include a first memory 110d, a second memory 120d, a third memory 130d, an input data processor 200d, a calculator 300d, a postprocessor 400d, and a matrix generator 500d. Since the first memory 110d, the second memory 120d, the third memory 130d, the input data processor 200d, the calculator 300d, and the postprocessor 400d are the same as or similar to the first memory 110, the second memory 120, the third memory 130, the input data processor 200, the calculator 300, and the postprocessor 400 of FIG. 1, descriptions thereof will be omitted.

The matrix generator 500d may receive stream data SD as a stream type. Herein, a stream may be collectively referred to as all data types other than a matrix. The matrix generator 500d may convert the stream data SD into a matrix type. The matrix generator 500d may perform a matrix transformation on stream data SD corresponding to input data ID and then store the generated input data ID in the first memory 110d. The matrix generator 500d may perform a matrix transformation on stream data SD corresponding to weight data WD and store the generated weight data WD in the second memory 120d.

Figure 14:
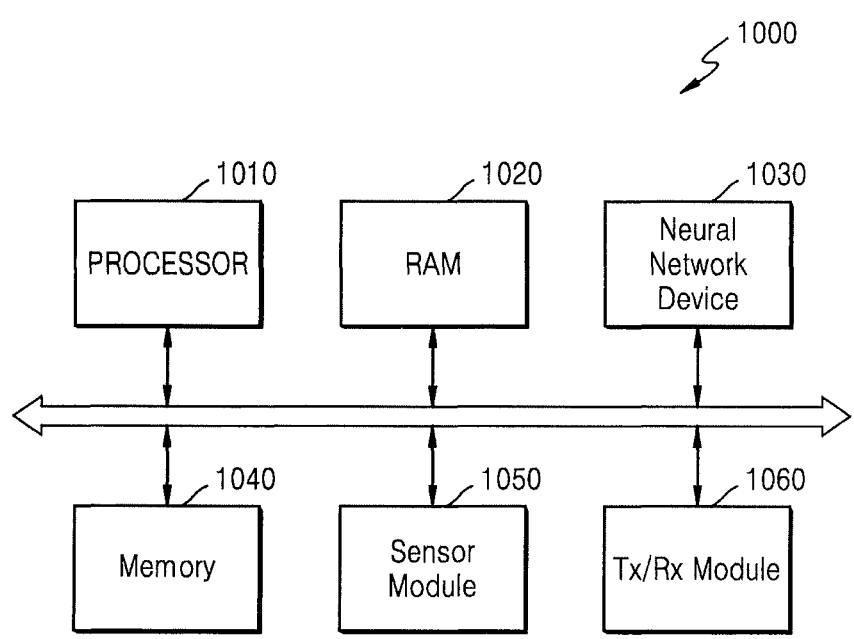
FIG. 14 is a block diagram of an electronic system according to some embodiments.

FIG. 14 is a block diagram of an electronic system 1000 according to some embodiments. Referring to FIG. 14, the electronic system 1000 may analyze input data in real-time based on a neural network, extract valid information, and judge a situation based on the extracted information or control components of an electronic device on which the electronic system 1000 is mounted. For example, the electronic system 1000 may be applied to a robot device (e.g., a drone and an advanced drivers assistance system (ADAS)), a smart TV, a smartphone, a medical device, a mobile device, an image display device, a measuring device, and an IoT device or mounted on at least one of various other kinds of electronic devices.

The electronic system 1000 may include a processor 1010, RAM 1020, a neural network device 1030, a memory 1040, a sensor module 1050, and a communication module 1060. The processor 1010 may control overall operations of the electronic system 1000. For instance, the processor 1010 may execute programs stored in the RAM 1020 and control functions of the neural network device 1030. The RAM 1020 may temporarily store programs, data, or instructions.

The neural network device 1030 may perform a calculation of a neural network based on the received input data and generate an information signal based on a result of the calculation. The neural network device 1030 may be hardware for performing a processing operation by using a quantized neural network of a fixed-point type and correspond to the above-described calculation device.

The memory 1040 may be a storage area for storing data. For example, the memory 1040 may store various data generated in the calculation performed by the neural network device 1030. The sensor module 1050 may sense or receive a signal (e.g., an image signal, a voice signal, a magnetic signal, a bio-signal, and a touch signal) from the outside of the electronic system 1000 and convert the signal into data. The communication module 1060 may include various wired or wireless interfaces capable of communicating with an external device.

The above-described embodiments of the inventive concept may be written as computer programs and may be implemented in general-use digital computers that execute the programs using a computer-readable recording medium. In addition, a structure of data used in the above-described embodiments may be recorded on a computer-readable recording medium through various units. Examples of the computer-readable recording medium may include storage media, such as magnetic storage media (e.g., read-only memory (ROM), floppy disks, hard disks, etc.) and optical recording media (e.g., CD-ROMs or DVDs).

While the inventive concept has been particularly shown and described with reference to embodiments thereof, it will be understood that various changes in form and details may be made therein without departing from the spirit and scope of the following claims.

What is claimed is:

1. A device comprising:
a first divider circuit connected to a first data lane and configured to receive a first data lane value having a first index, to receive a second index corresponding to a second data lane value from a second data lane, and to selectively output a first adding value or the first data lane value based on whether the first index is equal to the second index; and
a first adder circuit connected to the second data lane and the first divider circuit and configured to receive the first adding value from the first divider circuit, to receive the second data lane value, and to add the first adding value to the second data lane value to generate an addition result.

2. The device of claim 1, further comprising:
a first multiplier circuit configured to output a value obtained by multiplying first weight data and first input data received through the first data lane as the first data lane value to the first divider circuit; and
a second multiplier circuit configured to output a value obtained by multiplying second weight data and second input data together received through the second data lane as the second data lane value to the first adder circuit.

3. The device of claim 1, wherein the first index corresponds to a data address of the first data lane value, and the second index corresponds to a data address of the second data lane value.

4. The device of claim 1, wherein the first divider circuit outputs data of the first data lane value as the first adding value to the first adder circuit and outputs '0' as the first data lane value when the first index is equal to the second index, and wherein the first divider circuit outputs '0' as the first adding value to the first adder circuit and outputs data of the first data lane value as the first data lane value when the first index is not equal to the second index.

5. The device of claim 4, further comprising:
a second divider circuit connected to the first data lane and configured to receive the first data lane value from the first divider circuit, to receive a third index corresponding to a third data lane value from a third data lane, and to selectively output a second adding value or the first data lane value based on whether the first index is equal to the third index;
a third divider circuit connected to the second data lane and configured to receive the second data lane value from the first adder circuit, to receive the third index from the third data lane, and to selectively output a third adding value or the second data lane value based on whether the second index is equal to the third index; and
a second adder circuit connected to the third data lane, the second divider circuit and the third divider circuit and configured to receive the second adding value from the second divider circuit, to receive the third adding value from the third divider circuit, and to add the second adding value and the third adding value to the third data lane value to output an added value through the third data lane.

6. The device of claim 5, wherein the second divider circuit outputs data of the first data lane value as the second adding value to the second adder circuit and outputs '0' as the first data lane value when the first index is equal to the third index, wherein the second divider circuit outputs '0' as the third adding value to the second adder circuit and outputs data of the first data lane value as the first data lane value when the first index is not equal to the third index, wherein the third divider circuit outputs data of the second data lane value as the third adding value to the second adder circuit and outputs '0' as the second data lane value when the second index is equal to the third index, and wherein the third divider circuit outputs '0' as the third adding value to the second adder circuit and outputs data of the second data lane value as the second data lane value when the first index is not equal to the third index.

7. The device of claim 6, wherein the third divider circuit outputs '0' as the third adding value when the second divider circuit outputs the data of the first data lane value as the second adding value, and wherein the second divider circuit outputs '0' as the second adding value when the third divider circuit outputs the data of the second data lane value as the third adding value.

8. The device of claim 5, further comprising a multiplexer circuit connected to the second divider circuit and the third divider circuit and configured to receive the second adding value from the second divider circuit, to receive the third adding value from the third adding value from the third divider circuit, and to selectively output the second adding value or the third adding value to the second adder circuit.

9. The device of claim 8, wherein the multiplexer circuit outputs an adding value that is not '0' to the second adder circuit that is selected from among the second adding value and the third adding value.

10. The device of claim 1, wherein the first divider circuit receives a first valid value indicating whether the data of the first data lane value is '0' and a second value indicating whether the data of the second data lane value is '0', and wherein the first divider circuit determines the first adding value based on whether the first value is equal to the second value and whether the first index is equal to the second index.

11. The device of claim 10, wherein the first divider circuit outputs the data of the first data lane value as the first adding value to the first adder circuit and outputs '0' as the first data lane value only when both the first data lane value and the second data lane value are not '0' based on the first valid value and a second valid value and the first index is equal to the second index, and wherein the first divider circuit outputs '0' as the first adding value to the first adder circuit and outputs the data of the first data lane value as the first data lane value when at least one of the first data lane value and the second data lane value is '0' based on the first valid value and the second valid value or the first index is not equal to the second index.

12. The device of claim 1, further comprising: a fourth divider circuit connected to a third data lane and configured to receive a third data lane value having a third index through an input terminal of the third data lane, to receive a fourth index corresponding to a fourth data lane value from a fourth data lane, and to selectively output a fourth adding value or the third data lane value based on whether the third index is equal to the fourth index; and a third adder circuit connected to the fourth data lane and the fourth divider circuit and configured to receive the fourth adding value from the fourth divider circuit, to receive the fourth data lane value through an input terminal of the fourth data lane, and to add the fourth adding value to the fourth data lane value to generate an addition result.

13. The device of claim 12, further comprising an address sorter circuit configured to receive the first to fourth data lane values, to sort the first to fourth data lane values based on data addresses corresponding to the first to fourth indices, and to output the sorted first to fourth data lane values.

14. The device of claim 13, further comprising a plurality of accumulation circuits configured to accumulate respective output data.

15. The device of claim 14, wherein each of the plurality of accumulation circuits comprises:

a register configured to store accumulated output data and output the accumulated output data; and a fourth adder circuit configured to receive the output data from the address sorter, to receive the accumulated output data from the register, to adding the output data to the accumulated output data to generate new accumulated output data and to store the new accumulated output data in the register.

16. A device comprising:

a matrix generator circuit configured to receive first data and second data, to perform a matrix transformation on the first data to generate input data, and to perform a matrix transformation on the second data to generate weight data;

a first memory configured to store the input data;

a second memory configured to store the weight data;

a plurality of input data processor units, each configured to receive the input data and the weight data, to generate indices corresponding to data addresses of output data based on the input data and the weight data, and to output the input data and the weight data along with the indices; and a calculator circuit configured to sort a value obtained by multiplying the input data and the weight data together according to an index, to generate output data, to accumulate the output data, and to generate accumulated output data according to an index.

17. The device of claim 16, wherein each of the plurality of input data processor units comprises:

a fetcher configured to receive first input data from the first memory and to generate the data addresses of the output data corresponding to the first input data; and a dispatcher configured to receive first weight data from the second memory, to receive the data address from the fetcher, to generate a first index based on the data address, and to output the first input data and the first weight data along with the first index to the calculator circuit.

18. The device of claim 17, wherein the dispatcher further outputs a valid value indicating whether at least one of the first input data and the first weight data is '0' to the calculator circuit.

19. A computer-implemented machine learning method comprising:

receiving, at a divider circuit connected to a first data lane, a first data lane value having a first index;

receiving, at the divider circuit, a second index corresponding to a second data lane value from a second data lane;

outputting, to an adder circuit connected to the second data lane and the divider circuit, data of the first data lane value as a first adding value and outputting '0' as the first data lane value when the first index is equal to the second index;

outputting '0' as the first adding value to the adder circuit and outputting data of the first data lane value as the first data lane value when the first index is not equal to the second index; and adding, at the adder circuit, the first adding value, the second data lane value to generate an addition result.

20. The computer-implemented machine learning method of claim 19, wherein the first index corresponds to a data address of the first data lane value, and the second index corresponds to a data address of the second data lane value.

* * * * *